(12) United States Patent
Castillo et al.

(10) Patent No.: US 7,399,028 B1
(45) Date of Patent: Jul. 15, 2008

(54) ENERGY-ABSORBING VEHICLE HOOD

(75) Inventors: Brian V. Castillo, Royal Oak, MI (US); Sheryl Wolf, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/777,321

(22) Filed: Jul. 13, 2007

(51) Int. Cl.
*B62D 25/10* (2006.01)

(52) U.S. Cl. .................. 296/193.11; 296/187.02; 296/187.04; 180/274; 188/376

(58) Field of Classification Search ............ 296/193.11, 296/187.02, 187.04, 187.09; 180/274; 188/376
See application file for complete search history.

(56) References Cited

U.S. PATENT DOCUMENTS 7,114,765 B2 10/2006 Ishikawa et al.

OTHER PUBLICATIONS

SAE Document #: 2001/01/0243, A Study of a Continuous Variable Valve Event and Lift (Vel) System, Book #: PT-122, Mar. 2001.

*Primary Examiner*—Joseph D Pape

(57) ABSTRACT

An energy-absorbing vehicle hood includes outer and inner layers defining a cavity filled with foam material. The outer layer fractures when subjected to a crush load to thereby transmit the load to the foam material where it is absorbed, and both layers are continuously and directly bonded to the foam material. A vehicle includes a vehicle hood assembly having outer and inner layers defining a cavity, with foam material filling the cavity. The outer layer fractures when subjected to a crush load to transmit the load to the foam material for uniformly absorption of the crush load. A hood panel is also provided for use with a vehicle, including an energy-absorbing polymer foam material entrapped between an outer and inner polymer membrane. The membranes have a crush strength, and the foam material is characterized by an absence of a reinforcing structure.

12 Claims, 2 Drawing Sheets

ENERGY-ABSORBING VEHICLE HOOD

TECHNICAL FIELD

The present invention relates to a vehicle hood having improved mass, energy-absorbing and inertial properties, and for reducing a maximum force and acceleration transmitted to an object upon impact between the object and the vehicle hood.

BACKGROUND OF THE INVENTION

Automotive vehicles are typically constructed using reinforced stamped metal body panels, which combine substantial overall strength and stiffness with a smooth, paintable exterior panel surface. Regarding vehicle hood panels or hoods in particular, panel stiffness is generally satisfied via the combination of a relatively high strength stamped metal outer surface, referred to as an "A-surface", supported by a series of engine-side or "B-surface" hat-section reinforcements, so named due to the resemblance of such reinforcements to an inverted hat. Such hat-section reinforcements are typically placed between the A-surface and the B-surface of the hood, and include a pair of upper flanges oriented toward the A-surface as well as a single lower flange surface oriented toward the B-surface, with the upper and lower flanges interconnected by a web portion. This conventional hood construction increases the bending stiffness of the hood by placing relatively stiff material, usually stamped steel, as far away as possible from the neutral axis of bending of the hood. However, a hood constructed in this manner may be less than optimal for certain purposes.

For example, in practice hat-section reinforcements are not welded to the customer-visible exterior surface or A-surface of the hood so as to avoid marring the A-surface, i.e., to avoid producing visible flaws in the finished exposed surface of the hood panel. Rather, an inner panel or hood inner is typically attached along the periphery of the outer panel, also known as the hood outer, with either a hemmed flanged mechanical connection or a down-turned and spot-welded flange. The hood inner is typically connected to the hood outer across the expanse of the hood using only a bead of glue or adhesive. As a result, transverse shear stresses resulting from a bending load applied to the hood during normal vehicle travel, such as are continuously imparted to the hood while a vehicle is in motion, may be less than optimally transmitted between the hood outer and the hood inner. Additionally, as hat-section reinforcements are typically stamped from sheet metal having a constant thickness, this geometry may result in under-utilization of material in the web sections, i.e., the interconnecting portions disposed between the upper and lower flanges of the hat-section reinforcement member.

SUMMARY OF THE INVENTION

Accordingly, an energy-absorbing vehicle hood is provided having a relatively high bending stiffness and a relatively low and uniform crush stiffness, with a surface of the vehicle hood being configured to respond in a predetermined manner when an object impacts the hood. The high bending stiffness enables the vehicle hood to remain relatively rigid and stable when the hood is closed and the vehicle is in operation, rendering the hood resistant to flutter or shake dynamics that may occur at high vehicle speeds. The low and uniform crush stiffness of the hood in turn ensures a compliant surface when the hood is subjected to a generally vertical crush load upon contact with an object.

In one aspect of the invention, an energy-absorbing vehicle hood bears the tensile and compressive stresses resulting from a bending load imparted to the hood during ordinary operation of the vehicle, with the hood absorbing a predetermined crush load after an impact between the hood and an object. The hood has an outer and inner layer defining a cavity therebetween, and energy-absorbing foam material fills the cavity. The outer layer fractures when exposed to the predetermined crush load, and transmits the crush load to the foam material for uniform absorption thereby. The energy-absorbing foam material is further configured to transmit the tensile and compressive stresses of the bending load to the outer and inner layers of the hood during the ordinary operation or travel of the vehicle. The outer and inner layers are each continuously and directly bonded to the foam material.

In another aspect of the invention, the energy-absorbing foam material is an expanded foam material constructed from polystyrene or polyurethane foam.

In another aspect of the invention, the energy-absorbing foam material has a maximum thickness of approximately 25 to 35 millimeters, and the outer and inner layers each have a maximum thickness of approximately 0.5 to 1.5 millimeters.

In another aspect of the invention, the outer layer forms a thin polymer membrane constructed from polycarbonate or fiber-reinforced resin.

In another aspect of the invention, a vehicle is provided including a vehicle hood assembly having outer and inner layers defining a cavity therebetween, and energy-absorbing foam material substantially filling the cavity. The outer layer fractures by design when subjected to a crush load exceeding a threshold crush strength to thereby transmit the crush load to the energy-absorbing foam material for uniform absorption thereby.

In another aspect of the invention, a hood panel is provided for use with a vehicle, including an energy-absorbing polymer foam material entrapped between an outer and an inner polymer membrane. The outer and inner polymer membranes each have a threshold crush strength, and the compressible polymer foam material is characterized by an absence of a separate reinforcing structure.

In another aspect of the invention, the predetermined crush strength is selected to enable the outer membrane to fracture in a brittle manner when the hood panel contacts an object imparting a crush load exceeding the threshold crush strength, and the compressible polymer foam uniformly absorbs the crush load upon fracture of the outer membrane.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
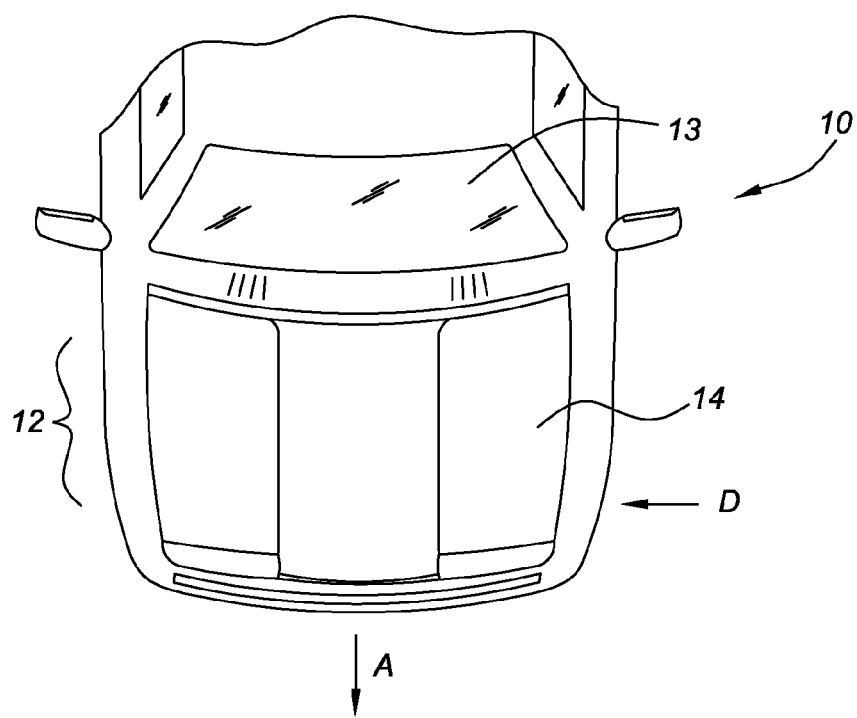
FIG. 1 is a schematic representation of a vehicle having an energy-absorbing hood assembly according to the invention.

Referring to the drawings, wherein like reference numbers correspond to like or similar components throughout the several figures, there is shown in FIG. 1 a vehicle 10 having a moveable or actuatable hood panel or hood 14 spanning or covering an engine compartment 12. Hood 14 is operatively attached to vehicle 10, such as one or more hinges (not shown) positioned adjacently to a windshield 13. Hood 14 is sufficiently sized and shaped to provide a closure panel suitable for covering an engine 35 (see FIG. 2) and/or another vehicle component contained within engine compartment 12. As represented in FIG. 1, vehicle 10 may move or travel in a direction of arrow A, thereby subjecting hood 14 to various stresses and loads as described below with reference to FIGS. 3 and 4.

Figure 2:
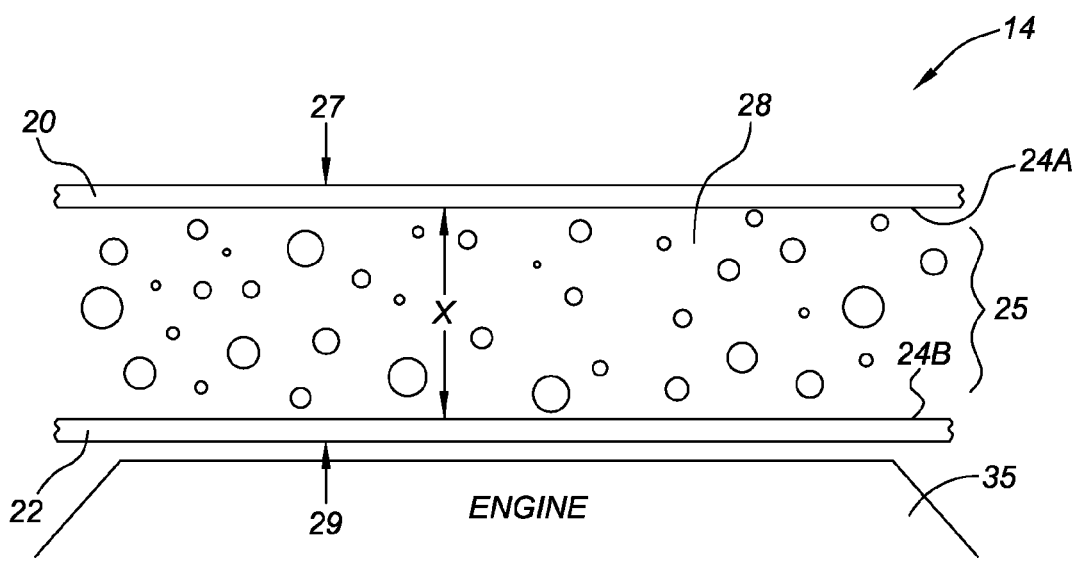
FIG. 2 is a schematic cut-away view of the energy-absorbing hood assembly shown in FIG. 1.

Turning to FIG. 2, hood 14 is shown in representative cross section from the perspective of arrow D of FIG. 1. A pair of thin membranes, surfaces, or layers 20 and 22 defines a space or cavity 25 therebetween. Layer 20 includes an outermost, customer-visible "A surface" 27, and is referred to hereinafter for clarity by its position relative to engine 35 as outer layer 20. Likewise, layer 22, being the inner-most/engine-side surface or "B surface" 29, is referred to hereinafter for clarity as inner layer 22. Outer layer 20 and inner layer 22 are each preferably a thin polymer layer, such as fiber-reinforced resin or polycarbonate, of approximately 0.5 to 1.5 millimeters in thickness. The respective outer and inner layers 20 and 22 are separated by a distance "x", with the value of distance x preferably being approximately 25 to 35 millimeters. However, other values of the distance x and/or thicknesses of either or both of outer and inner layers 20 and 22, respectively, may be usable within the scope of the invention.

A compressible, energy-absorbing foam material 28 fills substantially all of cavity 25, with foam material 28 being bonded directly and continuously to outer layer 20 along a first bonding interface or bonding layer 24A, and to inner layer 22 along a second bonding interface or bonding layer 24B. The use of such direct and continuous bonding between the respective outer and inner layers 20, 22 and foam material 28 allows the uniform transmission of transverse shear stresses associated with bending loads, represented by the upwardly-oriented arrows C of FIG. 3. Such bending loads are typically experienced by hood 14 during ordinary operation, motion, or travel of vehicle 10 (see FIG. 1), such as while driving along a surface of highway in the direction of arrow A. Also, such direct and continuous bonding also allows the respective outer and inner layers 20 and 22 to bear the various tensile and compressive stresses resulting from such a bending load (arrows C of FIG. 3) occurring during such ordinary operation, motion, or travel of vehicle 10, without thereby sacrificing the surface quality of A-surface 27. Therefore, foam material 28 is preferably constructed of an expanded, lightweight, shear-transmitting polymeric material such as polyurethane foam, polystyrene foam, and/or another similar material or combination of such materials, and which is sufficiently compressible as needed between outer and inner layers 20, 22, respectively.

Figure 3:
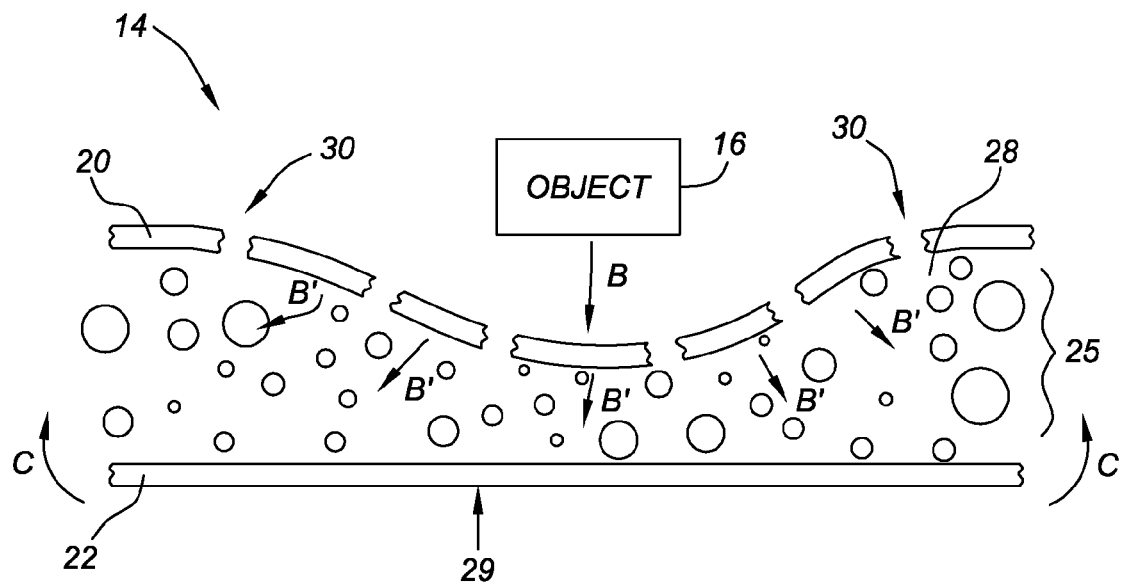
FIG. 3 is a representative schematic cut-away view of the energy-absorbing hood assembly shown in FIG. 2 upon impact with an obstacle.

Turning to FIG. 3, foam material 28 has specific qualitative material properties which may be selected to provide a particular "tunable" and substantially constant or uniform crush performance for a given threshold crush load. That is, as an object 16 impacts outer layer 20 of hood 14, the actual and relative mass, velocity, and acceleration of object 16 and vehicle 10 (see FIG. 1) combine to generate a crush load (arrow B) in a downward direction, i.e. in a generally opposite direction to the upward bending load (arrows C). Crush load (arrow B) therefore is directed from outer layer 20 toward inner layer 22, and has a specific magnitude. Each of the respective outer and inner layers 20 and 22 may be engineered, by virtue of their various geometries, to have relatively high tensile and compressive strength or stiffness to provide a preferred performance, while still maintaining a relatively low threshold crush strength permitting a particular response or "crush performance" when hood 14 is subjected to a crush load (arrow B) as described above, i.e., when the crush load (arrow B) exceeds the threshold crush strength of outer layer 20. To enable hood 14 to be utilized in a wide range of driving conditions, the threshold crush strength is preferably set at a sufficiently high level to permit contact with various small stones, hail, insects, minor debris, or other such representative small objects ordinarily encountered on a roadway without fracturing.

Accordingly, outer and inner layers 20, 22, respectively, are configured to bear sufficiently all of the various bending stresses, represented generally by arrows C, imparted to hood 14 during ordinary travel or operation of vehicle 10. Simultaneously, outer layer 20 is configured to fracture in a brittle manner upon impact between outer layer 20 and an object 16 as described hereinabove, thereby transmitting substantially all of the crush load (arrow B) to foam material 28 where it is uniformly transmitted and absorbed in accordance with the predetermined properties and/or geometries of foam material 28. Likewise, also as described hereinabove, foam material 28 is shear-transmitting, i.e., is configured to allow the relatively stiff outer and inner layers 20 and 22, respectively, to bear the majority of the tensile and compressive stresses that result from bending stresses (arrow C) occurring during ordinary vehicle travel. In this manner, construction of a relatively mass-efficient hood is enabled.

Still referring to FIG. 3, upon impact between an object 16 and hood 14, if a resulting crush load (arrow B) exceeds a predetermined design or threshold crush load, outer layer 20 is configured to immediately fracture, preferably by shattering or fracturing in a brittle manner, to thereby transmit the crush load (arrow B) to foam material 28. The transmitted crush load (arrow B') is then uniformly absorbed by foam material 28. Accordingly, within the scope of the invention, no additional reinforcement sections, portions, or other structure, such as the web sections or metal hat-section reinforcements described previously hereinabove, are included within the internal construction of hood 14, i.e., within the cavity 25 defined by or formed between outer and inner layers 20 and 22, respectively. Foam material 28 is selected to provide predetermined stress management and energy absorption, as described hereinabove, with outer layer 20 being specifically designed to fracture or shatter upon impact with obstacle 16 rather than to elastically yield, dent, or bend in the conventional manner of sheet metal in response to such an impact.

Figure 4:
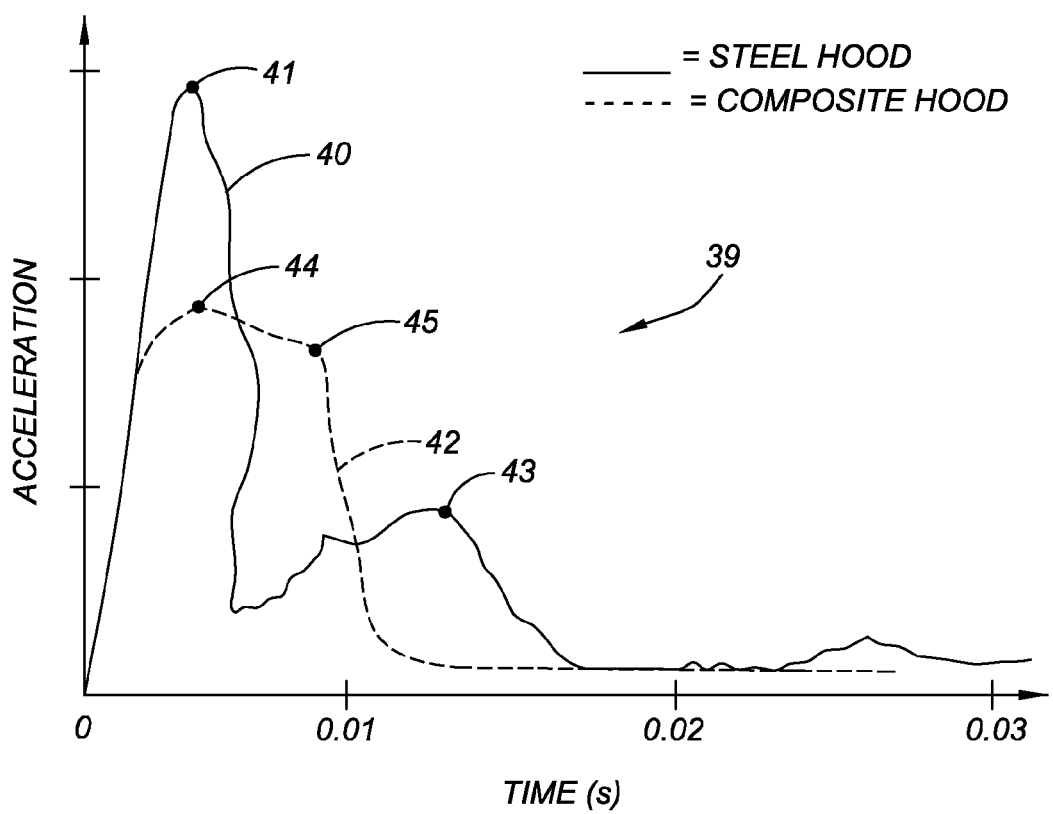
FIG. 4 is schematic curve or graphic illustration showing a representative acceleration performance profile of an energy-absorbing vehicle hood shown in FIGS. 1, 2, and 3.

Turning to FIG. 4, an acceleration curve 39 is shown comparing representative impacts between an object 16 (see FIGS. 1 and 3) and two different vehicle hoods, wherein acceleration is arranged on the Y-axis, and wherein time in seconds (s) is arranged along the X-axis. Steel curve 40 is an acceleration curve for a conventional reinforced steel hood, i.e., a stamped sheet metal hood having conventional hat-style structural reinforcements as described previously hereinabove. Likewise, composite curve 42 is an acceleration curve for hood 14 of the invention.

Curve 40 initially peaks at relatively high load, i.e., point 41, as the mass of the stamped metal hood rapidly slows or decelerates object 16 after a collision with hood 14 (see FIGS. 1, 2, and 3). Subsequent accelerations then occur, with a secondary peak occurring at point 43 of curve 40, followed by gradual attenuation. Such acceleration patterns may be produced, for example, when a stamped metal hood dents or deforms and quickly absorbs a substantial portion of the energy resulting from the impact (see FIGS. 1, 2, and 3).

By way of contrast, curve 42 has a substantially lower initial load peak, i.e., point 44, followed by a gradual deceleration until reaching a secondary peak at point 45, after which rapid deceleration occurs to a substantially constant and near-zero force level. In other words, an opposing force imparted to object 16 by hood 14 upon impact with hood 14 is relatively less variable or more constant, and has reduced amplitude relative to that shown in curve 40. This in turn reduces the total distance of travel required by a decelerating object 16 in order for hood 14 to fully absorb the energy from such a collision.

While the best modes for carrying out the invention have been described in detail, those familiar with the art to which this invention relates will recognize various alternative designs and embodiments for practicing the invention within the scope of the appended claims.

The invention claimed is:

1. An energy-absorbing hood for use with a vehicle, wherein said energy-absorbing hood is configured to bear tensile and compressive stresses resulting from a bending load imparted to the energy-absorbing hood during ordinary travel of the vehicle, and wherein said energy-absorbing hood is adapted to uniformly absorb a predetermined crush load resulting from an impact between an object and the energy-absorbing hood, the energy-absorbing vehicle hood comprising:

an outer layer and an inner layer defining a cavity therebetween; and an energy-absorbing foam material substantially filling said cavity;

wherein said outer layer and said inner layer are each directly and continuously bonded to said energy-absorbing foam material, said outer layer being adapted to fracture in response to the predetermined crush load to thereby transmit the predetermined crush load to said energy-absorbing foam material for uniform absorption thereby, and wherein said energy-absorbing foam material is configured to transmit the tensile and compressive stresses to said outer layer and said inner layer during the ordinary travel of the vehicle.

2. The energy-absorbing vehicle hood of claim 1, wherein said energy-absorbing foam material is an expanded polymer foam selected from the group of polystyrene foam and polyurethane foam.

3. The energy-absorbing vehicle hood of claim 1, wherein said energy-absorbing foam material has a maximum thickness of approximately 25 to 35 millimeters, and said outer and said inner layers each have a maximum thickness of approximately 0.5 to 1.5 millimeters.

4. The energy-absorbing vehicle hood of claim 1, wherein said outer layer forms a thin polymer membrane constructed from material selected from the group of polycarbonate and fiber-reinforced resin.

5. A vehicle comprising:

a vehicle hood assembly having an outer layer and an inner layer defining a cavity therebetween; and an energy-absorbing foam material substantially filling said cavity;

wherein said outer layer and said inner layer are each continuously and directly bonded to said energy-absorbing foam material, said outer layer being configured to fracture in a predetermined manner when subjected to a crush load exceeding a predetermined threshold crush load value, said crush load resulting from an impact between said vehicle hood assembly and an object, to thereby transmit said crush load to said energy-absorbing foam for uniform absorption of the transmitted crush load.

6. The vehicle of claim 5, wherein said energy-absorbing foam material is an expanded polymer foam selected from the group of polystyrene foam and polyurethane foam.

7. The vehicle of claim 5, wherein said energy-absorbing foam material has a maximum thickness of approximately 25 to 35 millimeters, and wherein said outer layer and said inner layer each have a maximum thickness of approximately 0.5 to 1.5 millimeters.

8. The vehicle of claim 5, wherein said outer layer forms a thin polymer membrane constructed from material selected from the group of polycarbonate and fiber-reinforced resin.

9. A hood panel for use with a vehicle, the hood panel comprising an energy-absorbing polymer foam material characterized by an absence of a separate internal reinforcing structure and entrapped between an outer and an inner polymer membrane, said outer polymer membrane and said inner polymer membrane each being continuously and directly bonded to said energy-absorbing polymer foam material;

wherein said outer polymer membrane has a threshold crush strength that is selected to enable said outer polymer membrane to fracture when the hood panel is subjected to a predetermined crush load exceeding said threshold crush strength that is directed from said outer polymer membrane toward said inner polymer membrane; and wherein said energy-absorbing polymer foam layer is configured to uniformly absorb substantially all of said predetermined crush load transmitted thereto upon said fracturing of said outer polymer membrane.

10. The hood panel of claim 9, wherein said energy-absorbing polymer foam material has a first maximum thickness and said outer polymer membrane has a second maximum thickness, said first maximum thickness and said second maximum thickness having a ratio of approximately 25:1 to 35:1.

11. The hood panel of claim 9, wherein said outer polymer membrane is constructed from material selected from the group of polycarbonate and fiber-reinforced resin.

12. The hood panel of claim 9, wherein said energy-absorbing polymer foam material is an expanded polymer foam selected from the group of polystyrene foam and polyurethane foam.

* * * * *